United States Patent [19]

Vonken et al.

[11] Patent Number: 5,484,649
[45] Date of Patent: Jan. 16, 1996

[54] PROCESS FOR FOAMING FLAME RETARDANT POLYSTYRENE AND POLYSTYRENE SHAPED ARTICLES

[75] Inventors: Hub A. G. Vonken, Weert; Jan op den Buysch, Budel-Dorplein, both of Netherlands

[73] Assignee: Hoechst Aktiengesellschaft, Frankfurt am Main, Germany

[21] Appl. No.: 467,053

[22] Filed: Jun. 6, 1995

Related U.S. Application Data

[62] Division of Ser. No. 243,824, May 17, 1994.

[30]  Foreign Application Priority Data

Jun. 5, 1993 [DE] Germany .................. 43 18 743.9

[51] Int. Cl.$^6$ ........................................ B32B 3/26
[52] U.S. Cl. .................. 428/220; 428/314.8; 521/79; 521/98; 521/146
[58] Field of Search ...................... 428/220, 314.8; 521/79, 98, 146; 264/50

[56]  References Cited

U.S. PATENT DOCUMENTS

| | | | |
|---|---|---|---|
| 3,669,923 | 6/1972 | Hintz | 521/79 |
| 4,298,702 | 11/1981 | Hahn et al. | 521/79 |
| 5,112,875 | 5/1992 | Zimmerman et al. | 521/60 |
| 5,149,721 | 9/1992 | Ishikawa et al. | 521/79 |

FOREIGN PATENT DOCUMENTS

| | | |
|---|---|---|
| 0084226 | 7/1983 | European Pat. Off. . |
| 9211584 | 4/1993 | Germany . |

OTHER PUBLICATIONS

Database WPI, "Thermoplastic Resin Foam", Derwent Publications Ltd., London, GB; & JP–A–58 211 426 Sekisui Plastics, Dec. 1993.

Database WPI, "Blending Styrene Resin with Foamer and Flame Retardant Mixture", Derwent Publications Ltd., London, GB; & JP–A–57 038 832 Sekisui Plastics, Mar. 1992.

Database WPI, "Dimensionnally Stable Styrene Resin Foam Production", Derwent Publications Ltd., London, GB; & JP–A–55 110 131 Sekisui Plastics, Aug. 1980.

*Primary Examiner*—Morton Foelak
*Attorney, Agent, or Firm*—Foley & Lardner

[57]  ABSTRACT

Polystyrene melts treated with flameproofing agents and nucleating agents are foamed by addition of alkanes, such as propane, butane or propane/butane mixtures, as blowing agents, such that the flame retardant properties of the polystyrene foams are achieved after a very short storage time, or at the latest after storage for three weeks at room temperature. Even after a storage time of one week, sufficient blowing agent is still present in the closed-cell pores of the polystyrene foams to be able to undertake adequate post-expansion of the foams with a foaming factor of 1.8 to 2.0.

4 Claims, 4 Drawing Sheets

PROCESS FOR FOAMING FLAME RETARDANT POLYSTYRENE AND POLYSTYRENE SHAPED ARTICLES

This application is a divisional of application Ser. No. 08/243,824 filed May 17, 1994.

BACKGROUND OF THE INVENTION

The present invention relates to a process for foaming polystyrene, which has been given a flame retardant treatment, by addition of blowing agents, and to a shaped article of extruded polystyrene foam.

Combustible gases are in general employed as blowing agents for foaming in the field of building materials which have been given a flame retardant treatment, such as sheets of plastic, expanded films, thermal insulation film webs and the like. These materials are produced by extrusion from foamed melts of plastic. The combustibility of these blowing agents or blowing gases is in conflict with the requirement for flameproofing, so that such building materials develop their full flame retardant properties only after a relatively long storage period, during which the blowing gas can escape from the cells of the foamed plastic.

German Utility Model No. 92 11 584 discloses a shaped article of polystyrene recycled material which is obtained by melting scrap polystyrene foam to form polystyrene, in order to allow the air enclosed to escape, and then converting the melt into expanded polystyrene, after addition of blowing agent. Pentane is used as the blowing agent, with the foaming operation taking place in the head of an extruder. The known shaped article is produced in the form of so-called continuous sheets, which are cut into the desired lengths and widths and then further processed as building material sheets. The known shaped article contains a flameproofing additive, which renders it "flame retardant" according to building materials class B1 in accordance with DIN 4102. The known shaped article of polystyrene recycled material is used as an insulating material for the building industry and meets the requirements of DIN 18 164 Part 1.

To prepare the polystyrene foam as the starting material for the known shaped article, the melt of scrap polystyrene is cooled to a temperature below the melting temperature and pressed into the shape of filaments, and the cooled filaments are comminuted into pieces. These component pieces are melted in another extruder, pentane is added as the blowing gas, which is forced in under a high pressure, and the melt is then extruded as a flexible foam via a slot die at temperatures below 150° C., where it is shaped by calibration. The storage time required before the full flame retardant properties of these building materials are achieved is not referred to.

SUMMARY OF THE INVENTION

It is an object of the present invention to provide an improved process for the production of polystyrene foam which has been given a flame retardant treatment. It is a particular object of the invention to provide a process in which, in spite of the use of combustible gases as blowing agents, the storage time required by the resulting building materials is shortened before their full flame retardant properties are achieved.

A further object of the invention resides in the provision of an improved polystyrene shaped article.

In accomplishing the foregoing objects, there has been provided in accordance with one aspect of the present invention a process for producing a foamed polymer article having flame retardant properties, comprising the steps of adding a blowing agent comprising propane, butane or a mixture of propane and butane to a styrene polymer melt; and subjecting the polymer melt to extrusion conditions sufficient to produce an extruded foamed polymer article. In a preferred embodiment, the process further comprises the steps of permitting the foamed article to rest for a period of at least about one week sufficient to adjust the content of blowing agent to at least a minimum amount required for further expansion of the foamed article by heat treatment, and then subjecting the article to further expansion under an elevated temperature to produce an increase in thickness in the article by a factor of from about 1.8 to 2.

In accordance with another aspect of the invention, there has been provided a shaped article of extruded styrene polymer foam into which a blowing agent gas is injected and which contains flameproofing agent, wherein the shaped article has a thickness of from about 1 to 10 mm, a width of from about 50 to 320 cm, a foam density of from about 30 to 70 g/l and a blowing agent content of up to about 3% by weight.

Further objects, features and advantages of the present invention will become apparent from the detailed description of preferred embodiments that follows, when considered together with the accompanying figures of drawing.

BRIEF DESCRIPTION OF THE DRAWINGS

The invention is described below in more detail with reference to the drawings. In the drawings.

DETAILED DESCRIPTION OF THE PREFERRED EMBODIMENTS

Figure 1:
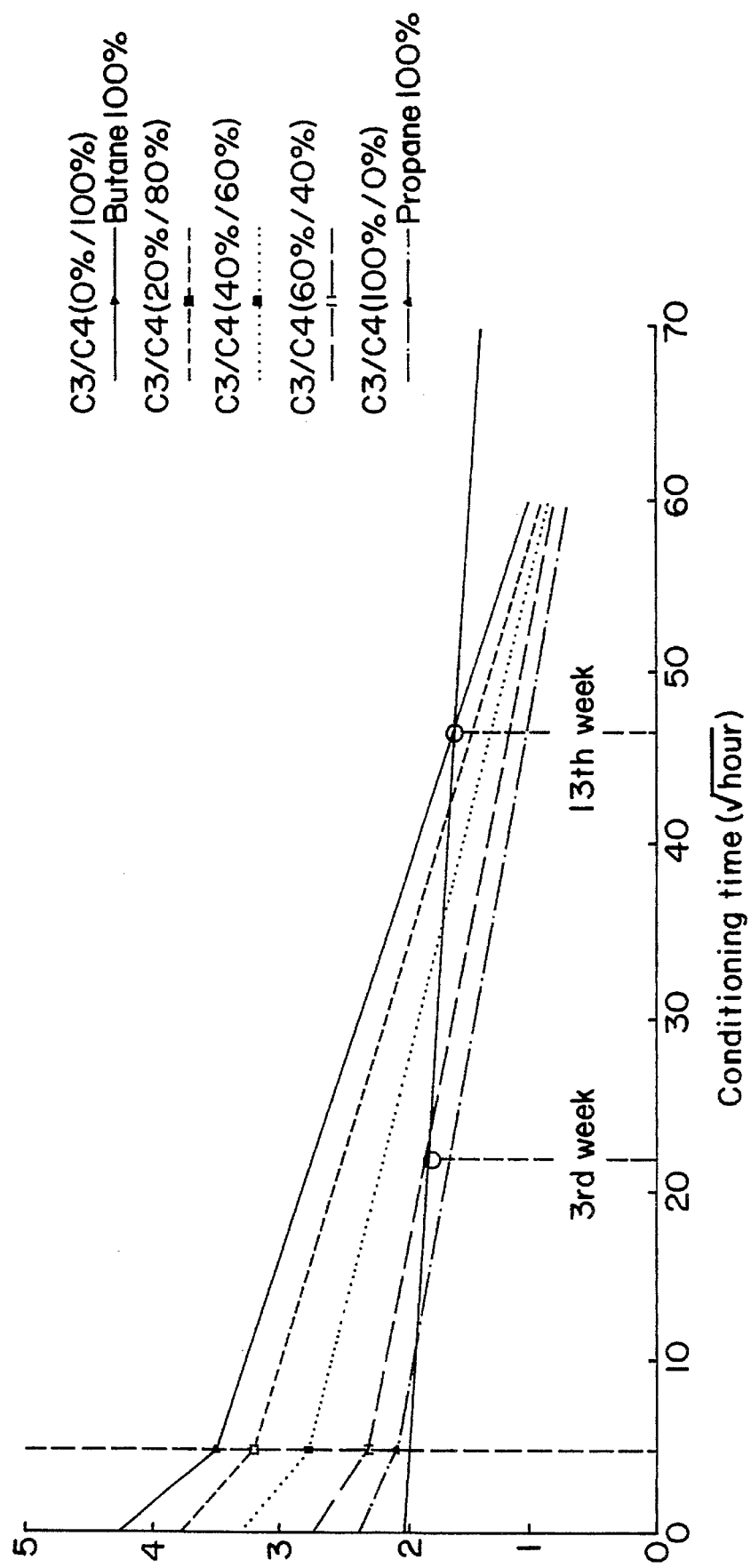
FIG. 1 is a graph showing the flameproofing properties of polystyrene shaped articles and the gas evolution of blowing agent as a function of the storage time for various compositions and percentages by weight of the blowing agent.

According to the invention, a process is provided in which propane, butane or mixtures of propane and butane are added as the blowing agent to the styrene polymer melt. The blowing agent here expediently comprises n-butane and/or iso-butane. In one preferred embodiment of the process, the constituents of the blowing agent are mixed in a ratio, based on the total volume of the blowing agent, of from about 10 to 100% by volume of propane, from about 0 to 90% by volume of n-butane and/or from about 0 to 90% by volume of iso-butane. Preferably, from about 60 to 90% by volume of propane are mixed with from about 10 to 40% by volume of n-butane and/or from about 10 to 40% by volume of iso-butane.

In a further preferred embodiment of the process, the polystyrene melt is melted from a polystyrene copolymer, a copolymer of styrene and butadiene or polymers of styrene or mixtures thereof.

A polystyrene shaped article which has a thickness of 1 to 10 mm, a width of from about 50 to 320 cm, a foam density of from about 30 to 70 g/l and a blowing agent content after a storage time of three weeks of up to about 3% by weight is formed from the extruded polystyrene foam.

In a further embodiment of the invention, a polystyrene shaped article comprising a closed-cell or closed-pore expanded film having a thickness of from about 1 to 5 mm, a width of from about 75 to 320 cm, a foam density of from about 60 to 70 g/l and a blowing agent content of from about 2.8 to 3% by weight is extruded. The polystyrene shaped article furthermore can constitute sheet goods having a thickness of from about 2 to 10 mm, a width of from about 50 to 200 cm, a foam density of from about 30 to 40 g/l and a blowing agent content after a storage time of three weeks of up to about 1.9% by weight.

After a storage time of 1 to 13 weeks, the polystyrene shaped article according to the invention is "normally flammable" to "flame retardant", according to building material classes B2 and B1 in accordance with DIN 4102. The blowing gas content with, for example, a propane/butane mixture of 60/40 is then less than 1.9% by weight.

The advantages achieved by the invention are that the storage time of the shaped articles produced from polystyrene foam before the full flame retardant properties are achieved is shortened, and that the pores or cells of the shaped article still contain sufficient blowing agent, even after a storage time of one week, to bring about foaming by a factor of 1.8 to 2.0 by a subsequent heat treatment. It is also advantageous that the emission of hydrocarbons can be reduced by appropriate choice of the blowing agent composition.

A polystyrene melt of polystyrene granules, flameproofing agent and nucleating agent is melted in the first extrusion step. Gases are injected into this melt as the blowing agent under a high pressure of up to about 350 bar at the end of the first extrusion step. The blowing agent is mixed homogeneously with the polystyrene melt, and before a second extrusion step, the polystyrene melt is homogenized further and cooled to a melt temperature of below about 150° C. before the extrusion. Propane, butane or a mixture of these two alkanes is fed to the polystyrene melt as the blowing agent. The blowing agent here comprises n-butane and/or iso-butane. The constituents of the blowing agent are mixed in a ratio, based on the total volume of the blowing agent, of from about 10 to 100% by volume of propane, from about 0 to 90% by volume of n-butane and/or from about 0 to 90% by volume of iso-butane. A ratio of from about 60 to 90% by volume of propane and from about 10 to 40% by volume of n-butane and/or from about 10 to 40% by volume of isobutane is particularly preferred. The basic materials for the extruded foam are homo-polystyrene and styrene copolymers, including copolymers of styrene and butadiene, styrene/maleic anhydride copolymers, acrylic/butadiene/styrene copolymers, polyphenylene oxide or mixtures thereof. The polymers are made up predominantly of styrene and are referred to herein as "polystyrene" for simplicity.

The nucleating agents added serve to keep the pore or cell dimensions in the expanded polystyrene film extruded from the polystyrene melt or the polystyrene shaped article as uniform as possible. Nucleating agents which are added are, above all, chalk and/or talc, in each case chosen as a function of the blowing agent composition. The talc content in the talc/chalk mixture can be reduced as the propane content in the blowing agent increases, as will be explained later with the aid of the figures. Endothermal nucleating agents which can be used are citric acid and sodium bicarbonate.

Halogenated alkyl-aryl phosphates, ammonium polyphosphates, hexabromocyclododecane and magnesium hydroxide are added to the starting substances of the polystyrene melt as preferred flameproofing agents.

The extrudate of polystyrene foam is produced in a tandem extruder line. In a first extrusion step, a mixture of polystyrene granules, flameproofing agent and nucleating agent is processed to a homogeneously flowing polystyrene melt in the primary extruder. At the outlet of the primary extruder, the blowing agent is injected under a high pressure and is mixed intensively with the polystyrene melt. This mixture is transported with the aid of a deflecting device into a secondary extruder, and is further homogenized therein and cooled to the desired melt temperature of below 150° C. This polystyrene melt is then extruded through an annular die with a narrow gap. Foaming in the polystyrene melt takes place when the polystyrene melt emerges from the annular die. The expanded film bubble extruded from the annular die has a certain blow-up or expansion ratio and is then drawn over a cooling mandrel, cut into two film webs at the end of the calibration operation and wound up into reels. The reels are closed-cell or closed-pore expanded films having a thickness of 1 to 5 mm, a width of 50 to 320 cm, a foam density of 60 to 70 g/l and a blowing agent content of up to about 3% by weight. This blowing agent content arises because, immediately after formation of the polystyrene foam, the fine cells or pores are filled with blowing agent and the partial air pressure in the pores is zero. This blowing agent content of up to 3% by weight is sufficient to enable adequate post-expansion by a subsequent heat treatment. The specific dimensions of the expanded film result from the dimensions of the annular die used. Instead of an annular die, a corresponding slot die can also be employed on the secondary extruder in order to obtain sheet goods having a thickness of 2 to 10 mm, a width of 50 to 200 cm, a foam density of 30 to 40 g/l and a blowing agent content after a storage time of three weeks of 1.7 to 1.9% by weight.

After extrusion of the expanded film bubble or of the shaped article, the blowing agent diffuses very slowly out of the pores of the polystyrene foam, and on the other hand a very rapid intrusion of air occurs, which leads to an increase in the total gas pressure in the cells in accordance with Dalton's law. The optimum gas pressure for a subsequent heat treatment of the expanded film or of the shaped article is reached within a storage time of some days at room temperature. For example, the foam density of sheet goods which are processed to form insulation sheets can be reduced by a factor of up to 2 with the aid of subsequent heat treatment in a so-called post-expansion operation, which is equivalent to increasing the thermal insulation properties by a factor of 2.

Polystyrene melts which are extruded to form polystyrene foams after direct injection of blowing agent, such as n-butane, show a good flame retardant action, i.e., they are "normally flammable" to "flame retardant" according to building material classes B2 and B1 in accordance with DIN 4102. However, this is achieved only after storage at a room temperature of 22° C. for some months, even though these products have been given a flame retardant treatment, as can be seen from FIG. 1. In this figure, the gas evolution of butane, propane and mixtures of these two alkanes is plotted as a function of the conditioning time. The conditioning time is obtained from the root of the storage time. The parameter of the curves is the mixing ratio of propane to butane, the limit of the group of curves being pure propane and pure butane as the blowing agent. The foam thickness is 3.2 mm and the foam density 65 g/l. The content of blowing agent in percent by weight, based on the polystyrene foam, is in the range from 2.6 to 4.3% by weight at the start of the gas evolution and immediately after the second extrusion step has ended. After a storage time of thirteen weeks, the weight content of the blowing agent is less than 1.6%. If the top curve in FIG. 1, which indicates a butane content of 100% in the blowing agent, is taken into consideration, it can be seen that the butane evolution from the pores of the polystyrene foam takes place very slowly. As the storage temperature increases, the butane permeability increases greatly in a similar manner to the diffusion coefficient. This temperature dependence of the butane permeability can be described by an equation of the Arrhenius type:

$$P = P_0 e^{-E_p/RT}$$

in which $P_0$ is a constant, $E_p$ is the activation energy of the total permeation process, R is the gas constant and T is the temperature. A temperature exposure of, for example, no more than 60° C. shortens the storage time considerably, but the resulting energy- and environment-related aspects suggest that heat treatment at these temperatures is not advisable for economic reasons. These reasons include, inter alia, the high energy expenditure for heating up to 60° C., the severe gas evolution, with the associated additional emission of hydrocarbons into the environment, and the difficulty of being able to carry out a reasonable thermal after-treatment to achieve post-expansion of polystyrene shaped articles, since in general the content of blowing agent in the closed cells is then no longer sufficient for the post-expansion. In FIG. 1, a dividing line (solid line) is drawn between "readily flammable" on the one hand, and "normally flammable" to "flame retardant" polystyrene foams, on the other hand. This dividing line does not run horizontally but falls at a slight angle as the conditioning time increases. The higher the propane content in the blowing agent, the sooner flameproofing according to building material class B2 is achieved at a higher content of blowing agent, in comparison with the other mixtures of propane and butane and pure butane.

The polystyrene foam extruded with 100% butane achieves flameproofing according to building material class B2 only after storage for three months. If extrusion is carried out with a propane/butane mixture in a weight ratio of 60 to 40, good flame retardant properties are already achieved within three weeks of storage of foamed reel goods or after-foamed shaped articles or finished products, the storage time in each case being calculated from the extrusion date.

In spite of the use of combustible blowing agent, the flame retardant properties of extruded polystyrene foams or polystyrene shaped articles can be realized considerably faster, without increasing the temperature, by the process according to the invention than in the case of conventional polystyrene foams which are foamed with other blowing gases. The fact that the foam densities of the polystyrene expanded films and the sheet goods remain at about the same order of magnitude is important here.

Figure 2:
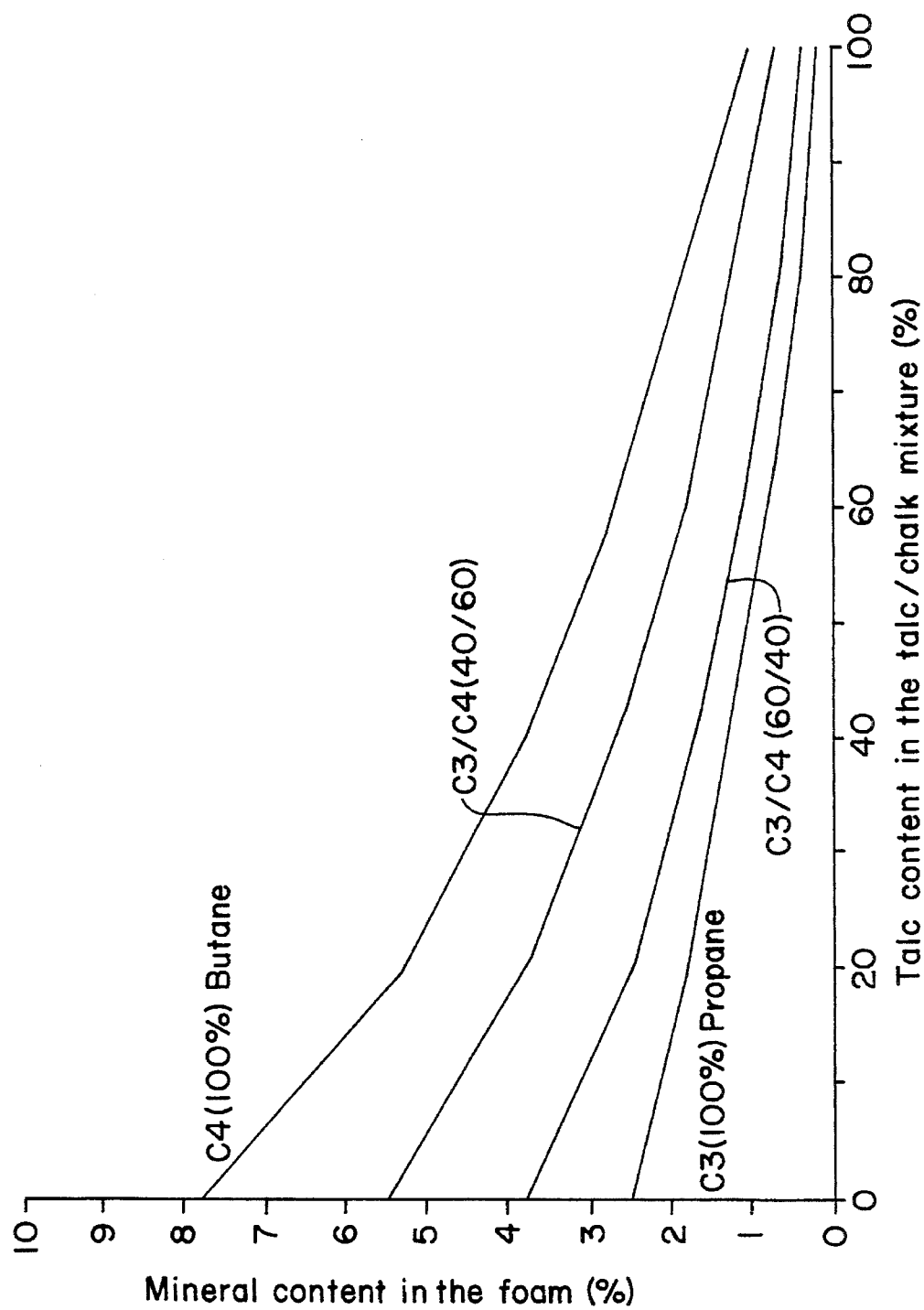
FIG. 2 is a graph showing the mineral content in % by weight in the polystyrene foam as a function of the talc content percentage in the talc/chalk mixture.

FIG. 2 shows the nucleating properties of the nucleating agents for some propane and butane mixing ratios. As the content of propane in the propane/butane blowing agent mixture increases, the nucleating effect increases, and the talc content must therefore be reduced. If regenerated material is additionally added to the starting substances of the polystyrene melt, the nucleation is too severe. The talc content in the talc/chalk mixture is only 0.2 to 0.6 percent here. If chalk or a chalk/talc mixture is employed as the nucleating agent instead of talc, the nucleating effect is weakened to the desired extent, so that a higher and more precise metering with nucleating agent can be employed.

The curves in FIG. 2 show the mineral content in the polystyrene foam in percent by weight as a function of the percent talc content in the talc/chalk mixtures. The parameter of these curves is the alkane composition of the blowing agent. The top curve has 100% butane as the blowing agent, while the bottom curve has 100% propane as the blowing agent. The two curves in between have a mixing ratio of propane to butane of 40 to 60 and, respectively, 60 to 40.

Figure 3:
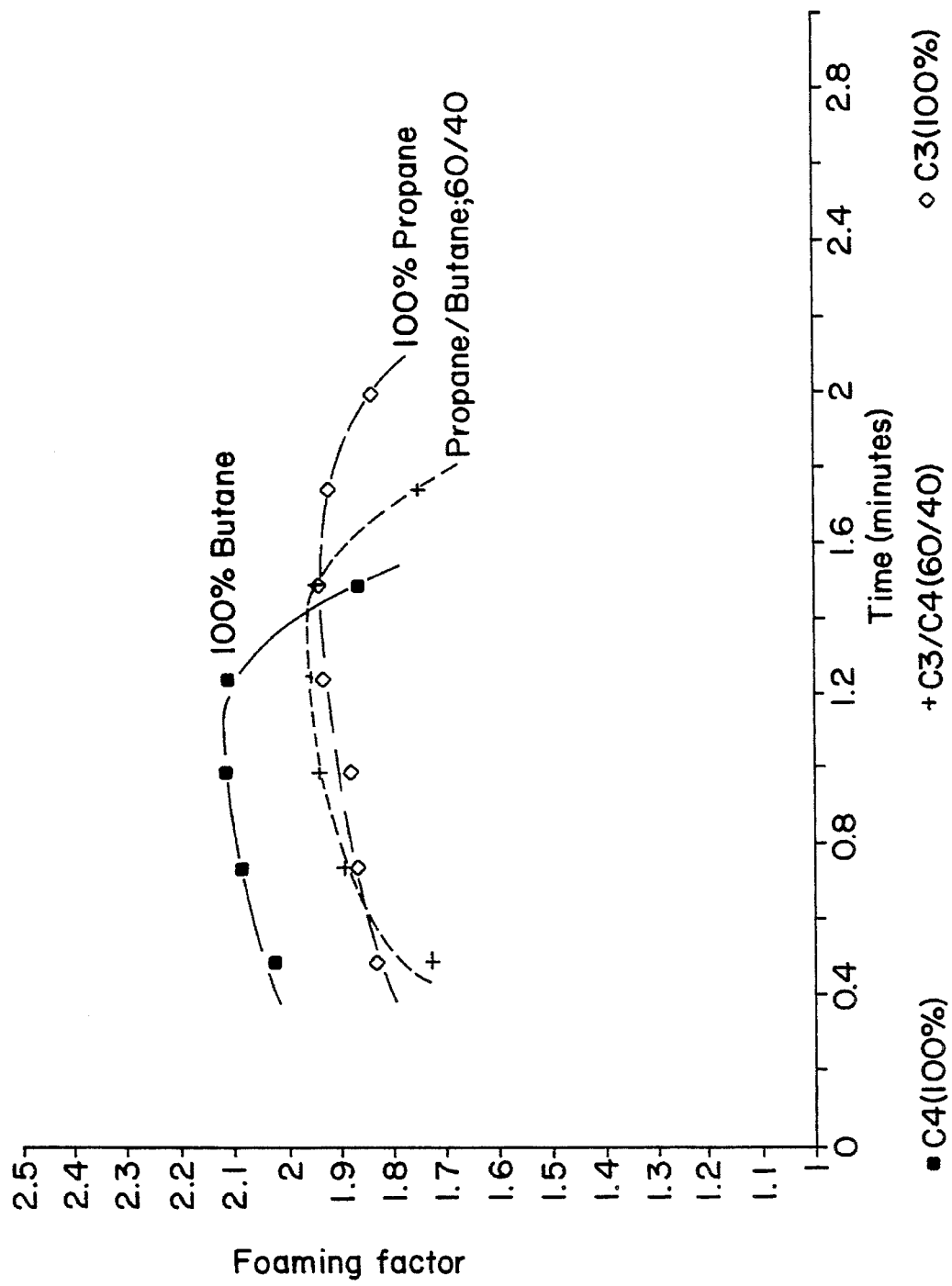
FIG. 3 is a graph showing the foaming factor of the polystyrene shaped article stored for one week as a function of the thermal after-treatment time, and the blowing gas content in % by weight.

In FIG. 3, the foaming factor is plotted against the treatment time in minutes. The foaming factor is defined as the quotient of the foam thickness after and before the heat treatment of polystyrene foams or polystyrene shaped articles. The foaming factor is in general measured here at 130° C. by convective circulation of hot air in a hot air oven. A foaming factor of 1.8 to 2.0 is completely adequate for the post-expansion operation on conditioned polystyrene foams or shaped articles, which is equivalent to the thickness dimensions of the subsequently heat-treated products being increased by this factor of 1.8 to 2.0. The post-expansion operation is in general carried out after a storage time of two to seven days. This means that adequate blowing agent for the post-expansion must still be present in the closed-cell pores, which then expands correspondingly by the convective heat treatment at 130° C. over a period of about 2 to 2.4 minutes and thus causes enlargement of the dimensions and reduction of the foam density. The products are in general stored at an ambient temperature of 22° C. It can be seen from the three curves shown in FIG. 3 that the processing time increases with a higher propane content in the blowing agent, since the relatively flat curve allows a processing time of 0.4 to about 2 minutes for a blowing agent of 100% propane, while on the other two curves, with a lower propane content in the blowing agent, the processing time range is less than 1.8 minutes.

Figure 4:
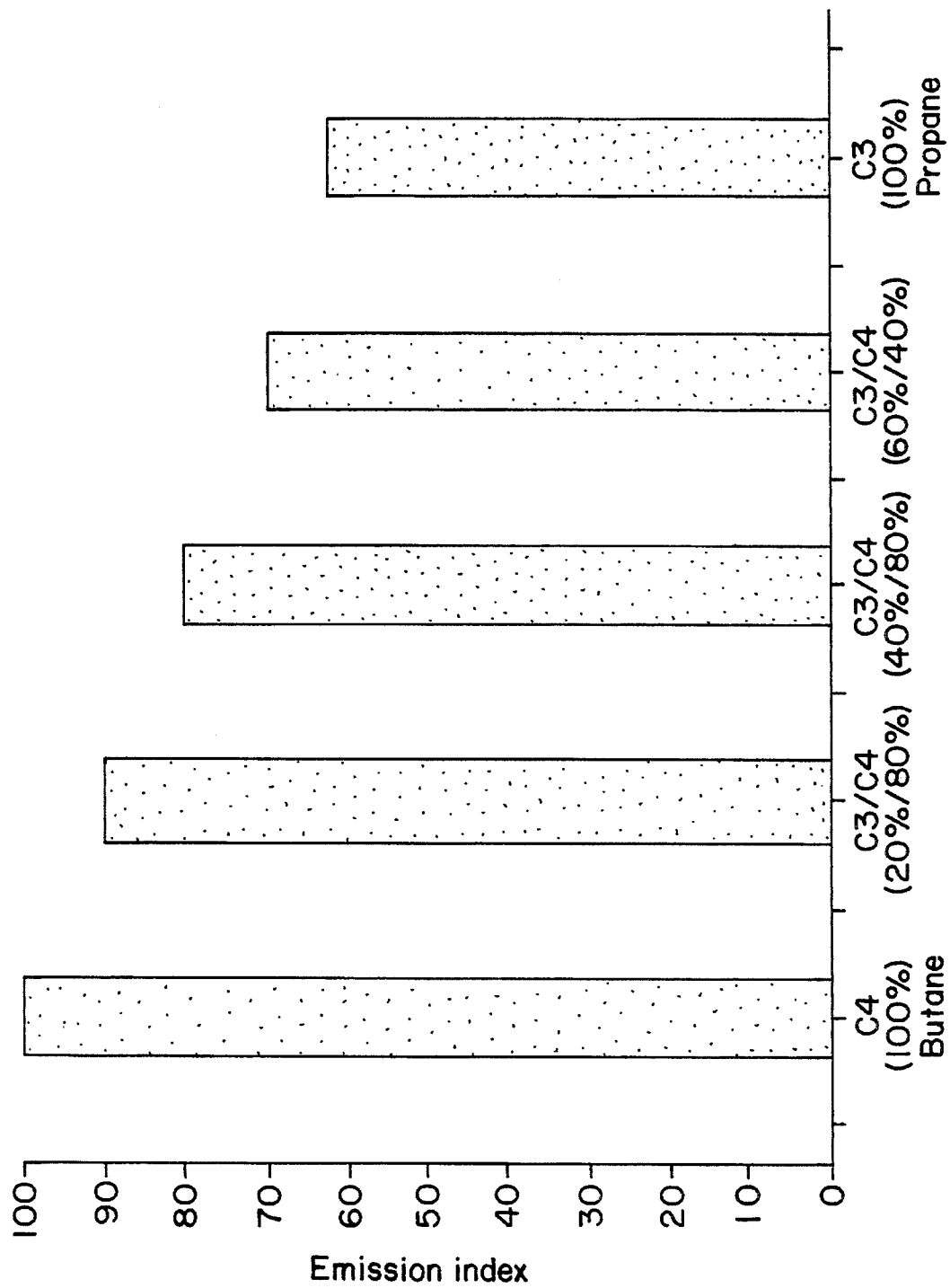
FIG. 4 is a chart showing the emission index of propane, butane and mixtures thereof from polystyrene foam which has a certain foam density.

FIG. 4 shows the emission index of hydrocarbons during production of polystyrene foams having a foam density of 65 g/l with blowing agent additions of 100% butane, propane/butane mixtures in ratios of 20:80, 40:60 and 60:40, and 100% propane. It can be seen from FIG. 4 that the hydrocarbon emission is reduced by using propane and also propane/butane mixtures, compared with addition of 100% butane. In this respect, pollution of the environment due to hydrocarbon emissions is reduced by selection of the appropriate blowing agent additive.

EXAMPLE

Burning tests in accordance with DIN 4102-B2 were carried out with polystyrene foams produced by the process according to the invention described above, the extruded foams having a weight per unit area of 200 g/m². The foam density was always 65 g/l.

The blowing agents were 100% butane, 20:80 and 60:40 propane/butane mixtures and 100% propane. The weight content of the blowing agent after a storage time of three weeks to two months was between 2.8 and 1.2%. Flame retardant properties of building material class B2 were obtained in the case of a storage time of three weeks for a 60:40 propane/butane mixture and for 100% propane as the blowing agent, but not for propane contents lower than 60% in the blowing agent. These flame retardant properties were also achieved for a 20:80 propane/butane mixture in the case of storage for two months.

What is claimed is:

1. A shaped article of extruded styrene polymer foam into which a blowing agent gas which comprises propane, butane or a mixture thereof is injected and which contains flame-proofing agent, wherein the shaped article has a thickness of from about 1 to 10 mm, a width of from about 50 to 320 cm, a foam density of from about 30 to 70 g/l and said blowing agent content of up to about 3% by weight.

2. A shaped article as claimed in claim 1, which comprises sheet goods having a thickness of from about 2 to 10 mm, a width of from about 50 to 200 cm, a foam density of from about 30 to 40 g/l and a blowing agent content after a storage period of 3 weeks of up to about 1.9% by weight.

3. A shaped article as claimed in claim 1, which is "normally flammable" to "flame retardant" according to building material classes B2 and B1 in accordance with DIN 4102 after a storage time of 1 to 13 weeks.

4. A shaped article as claimed in claim 1, wherein the thickness has been increased by a factor of about 1.8 to 2 by subsequent heat treatment within one week after formation by extrusion.

* * * * *